United States Patent [19]

Milton

[11] 4,282,475
[45] Aug. 4, 1981

[54] AUTOMOTIVE CHARGER SYSTEM

[76] Inventor: Russell E. Milton, 712 E. 4th St., Alturas, Calif. 96101

[21] Appl. No.: 971,489

[22] Filed: Dec. 20, 1978

[51] Int. Cl.³ ............................................. H02J 7/00
[52] U.S. Cl. ....................................... 320/6; 320/15; 320/54
[58] Field of Search ........................ 320/2, 5, 6, 7, 15, 320/54, 55, 57, 59, 56, 8; 307/150

[56] References Cited

U.S. PATENT DOCUMENTS

| | | | |
|---|---|---|---|
| 3,286,152 | 11/1966 | Noe | 320/7 |
| 3,317,810 | 5/1967 | Inoue | 320/56 |
| 3,414,796 | 12/1968 | Henquet | 320/54 X |
| 3,457,491 | 7/1969 | Black et al. | 320/54 X |
| 3,463,995 | 8/1969 | Herold | 320/6 |
| 3,530,356 | 9/1970 | Aronson | 320/7 X |
| 3,763,415 | 10/1973 | Ownby | 320/6 |
| 3,898,547 | 8/1975 | Poole | 320/5 X |
| 3,904,947 | 9/1975 | Crews | 320/2 |
| 4,136,382 | 1/1979 | Ricci | 320/57 X |

*Primary Examiner*—Robert J. Hickey
*Attorney, Agent, or Firm*—Robert R. Tipton

[57] ABSTRACT

A motor vehicle battery charger is mounted on and carried with the motor vehicle. A tension releasable power source connector automatically disconnects the charger from the stationary source of alternating current power when the vehicle is driven off. A first relay is used to prevent discharge of the battery when the charger is disconnected from the power source and to prevent current flow from one battery to another where a dual battery system is used. A second relay is used to disconnect the charger when the vehicle electrical system is connected to the batteries.

6 Claims, 3 Drawing Figures

AUTOMOTIVE CHARGER SYSTEM

BACKGROUND OF THE PRIOR ART

This invention relates generally to motor vehicle battery charger systems and in particular to motor vehicle battery charger systems that are mounted on and carried with the vehicle.

It has been the practice in the past to recharge motor vehicle batteries outside the vehicle. In most cases, the battery chargers of the prior art were bulky and required vacuum tubes in order to provide the high direct current requirements for charging low voltage, 6 and 12 volt, batteries used in a motor vehicle electrical system. To carry such apparatus on a motor vehicle would be impractical because of the space requirements needed to house the charger. However, with the advent of high current density solid state devices, the size of moderately high current density battery charges has become smaller.

For most automotive needs, the automobile generator provides sufficient charging capacity for the average vehicle, however, for vehicles in which added electrical accessories have been installed, such as and for emergency vehicles such as CB radios, radio telephones, spot lights, roof mounted emergency signals, etc., fire engines and the like, which can be inactive for long periods of time, batteries must be fully charged at all times for maximum service.

In addition, battery charges for such vehicles must be fail-safe and require no additional activities on the part of the vehicle user to manually perform a separate act to disconnect the power source from the charger when the vehicle is started and set in motion, or to remember to disconnect the charger from the battery.

For vehicles with dual battery systems, precautions must also be taken to prevent the flow of current between batteries when the battery charger is not energized but permanently connected to the vehicle battery system.

The many battery charger systems of the prior art seem to have concentrated their effort on circuits for charging dual battery systems but provide no fail-safe circuitry when the charger loses its power while remaining connected to the battery.

SUMMARY OF THE INVENTION

The motor vehicle battery charger circuit of the present invention is attached to and carried on the motor vehicle and utiles a means for converting an alternating current to a direct current having a tension releasable input power connector electrically connecting the converter to the alternating current power source. A means for disconnecting the vehicle battery system from the DC output side of the converter is actuated when the converter is disconnected from the alternating current power source. A means for disconnecting the vehicle battery from the converter is actuated when the battery is connected to the vehicle electrical system. The means for disconnecting the battery from the converter when the converter is disconnected from the alternating current power source also opens the circuit connecting the two batteries of a dual battery system to each other.

It is therefore an object of the present invention to provide a vehicle mounted battery charger system for a motor vehicle.

It is a further object of the present invention to provide a vehicle mounted battery charger system having a tension release disconnect device for electrically disconnecting the charger from an alternating current power source when the vehicle leave its power source.

It is still another object of the present invention to provide a vehicle mounted battery charger system in which the batteries are disconnected from the charger when the power is disconnected from the battery charger.

It is still another object of the present invention to provide a vehicle mounted battery charger system in which the battery charger is disconnected from the batteries when the batteries are powering the vehicle electrical system.

It is still a further object of the present invention to provide a vehicle mounted battery charger system for a dual battery operated vehicle whereby current flow between batteries is prevented when the battery charger is not in use.

These and other objects of the present invention will be manifest upon study of the following detailed description when taken together with the drawing.

DESCRIPTION OF THE PREFERRED EMBODIMENT

Figure 1:
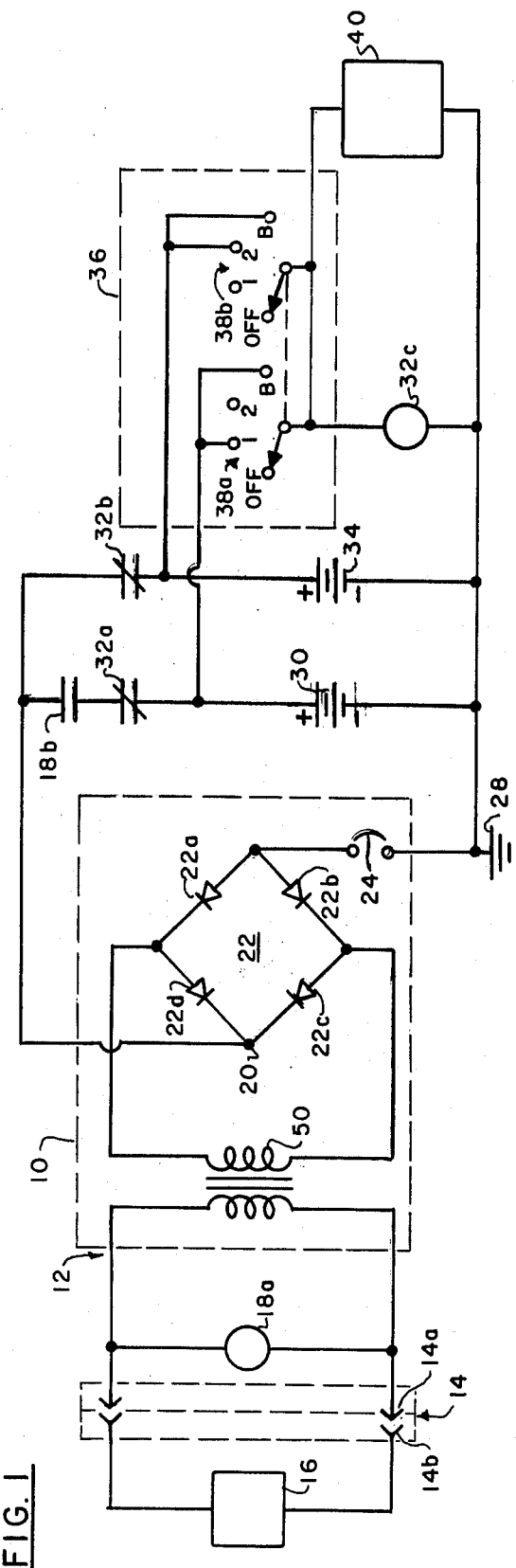
FIG. 1 is a schematic circuit diagram of the rectifier and and charger circuit of the present invention showing the circuit elements schematically.

With reference to FIG. 1 there is illustrated a schematic electrical wiring diagram of the charger system of the present invention for a dual battery system vehicle.

The system of FIG. 1 comprises, basically, an AC-DC converter 10 having an input side 12 connected to a tension releasable electrical connector 14 having a male member 14a and a female member 14b, said female member connected to an alternating current power source 16 apart form the vehicle such as a building electrical system outlet.

Across the input leads to input side 12 of converter 10 is connected relay coil 18a whose normaly open contact 18b is shown on the direct current side of rectifier 10 connected to positive pole 20 of bridge rectifier 22 of converter 10. The charger system of FIG. 1 further comprises a circuit breaker 24 connected to the negative pole 26 of bridge rectifier 22 and having its other side connected to ground 28.

A first battery 30 has its negative pole electrically connected to ground 28 and its positive pole connected to one side of normally closed contact 32a of relay 32 with the other side of contact 32a connected to one side of relay 18 contact 18b.

A second battery 34 has its negative pole electrically connected to ground 28 with its positive pole electrically connected to one side of normally closed contact 32b of relay 32 and with the other side of contact 32b connected to the positive pole 20 of bridge rectifier 22.

A selector switch assembly 36 comprising two mechanically interconnected rotary switches 38a and 38b which are used to connect either battery 30 or battery 34 or both battery 30 and battery 34 to the vehicle electrical system 40. The other side of vehicle electrical system 40 is, of course, connected to ground 28.

Connected in parallel across the vehicle electrical system 40 is the coil 32c of relay 32 which is used to actuate contacts 32a and 32b.

It can be seen that when selector switch assembly 36 is in the "off" position, the positive poles of batteries 30 and 34 are disconnected from the vehicle electrical system and relay coil 32c. Thus when relay 32 is unenergized, relay contacts 32a and 32b will be in the normally closed position (as shown). Also for relay 18, when relay coil 18a is unenergized, relay contact 18b will be in the open position (as shown).

Figure 2:
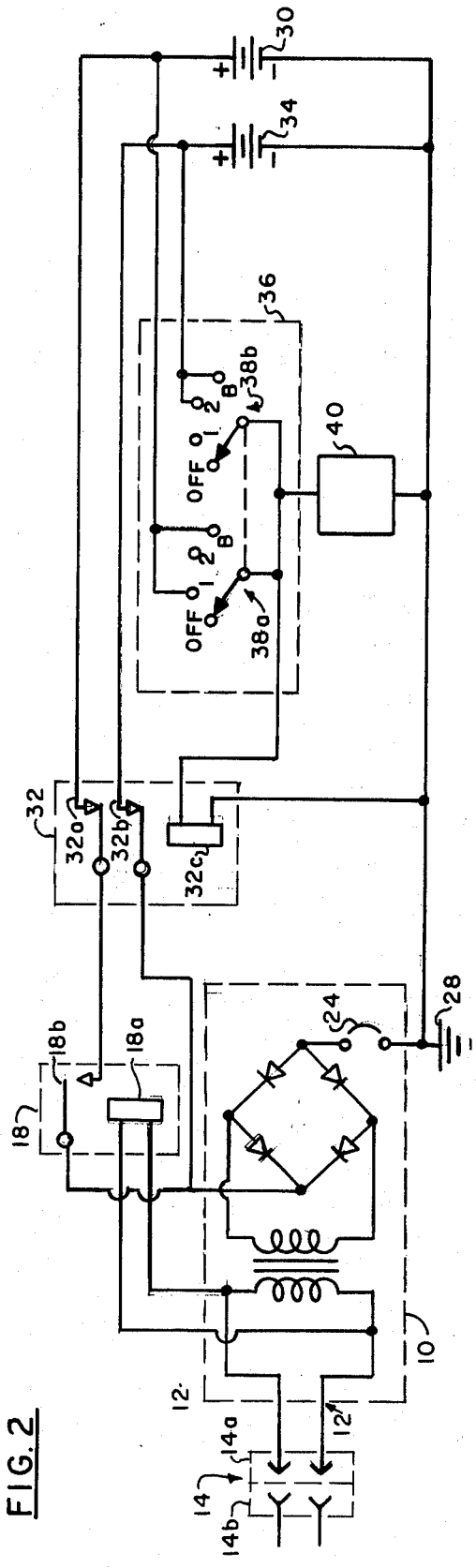
FIG. 2 is a wiring diagram of the charger system of the present invention showing the various circuit elements and how they are wired into, and electrically interconnected to the other circuit elements and the vehicle electrical system.

Referring to FIG. 2, the circuit elements are grouped together according to their mechanical function. Tension disconnect member 14 is shown connected to the input side 12 of rectifier 10 while relay 18 has its coil 18a connected across the input leads to bridge rectifier 22. Also contact 18b of relay 18 is connected to positive pole 20 of bridge rectifier 22 while the other side of relay contact 18b is connected to one side of contact 32a of relay 32. Also, one side of relay contact 32b is connected to positive pole 20 of bridge rectifier 22 while the other side of both relay contact 32a and relay contact 32b are connected to the positive pole of batteries 34 and 30 respectively. It will also be noted that rotary contact switches 38a and 38b are connected to batteries 30 and 34, respectively, with a rotary contactor connected together in common to vehicle electrical system 40. Also connected in parallel across vehicle electrical system 40 is relay coil 32c of relay 32.

As shown in FIGS. 1 and 2, AC-DC converter circuit 10 comprises a transformer 50 across which is connected bridge rectifier 22 comprising diodes 22a, 22b, 22c and 22d connected in the typical bridge type of circuit. Although a bridge rectifier circuit is shown, any type of rectifier circuit can be used which can also include various types of volatge regulating circuits common in the art.

Tension disconnect device 14 can be any frictionally held tension connecting device whereby the member will disconnect upon reaching a predetermined tension force pulling the male part 14a and the female part 14b apart to thus disconnect the charger system from alternating current power source 16.

To operate the battery charging circuit of the present invention, the vehicle, for example a fire engine, after returning to the station is parked and selector switch assembly 36 is turned to the "off" position. Then, in such condition, without being connected to alternating source 16, relay contact 18b of relay 18 is in the "open" position while relay contacts 32a and 32b of relay 32 are in the "closed" position. Thus battery 30 is completely disconnected from the automotive electrical system 40 and in addition is completely disconnected, by open relay contact 18b, from charger circuit 10. Battery 34 is also disconnected from vehicle electrical system 40 but being connected on the rectifier circuit side of relay contact 18b, it will experience a small electrical current flow back through bridge rectifier circuit 22 to ground, limited, however, by the high back resistance of diodes 22a, 22b, 22c and 22d.

It will also be noted that the positive pole of second battery 34 is disconnected from the positive pole of first battery 30 by open contact 18b of relay 18 thus preventing the cross-flow of current through either of the batteries depending upon the charge and voltage on the respective battery.

To begin charging the batteries, male plug member 14a is connected to female plug member 14b and energizing rectifier 10 thus causing a voltage to appear across relay coil 18a thus activating and closing relay contact 18b. Thus a current now begins to flow from positive pole 20 of bridge rectifier 22 through relay contact 18b, 32a and 32b to charge, respectively, batteries 30 and 34. The charging current, of course, is small as one would refer to the charger as a "trickle" charger to avoid the necessity of removing the caps on each of the batteries to allow for the escape of the hydrogen gas developed during charging process. Such gasses may create an internal pressure caused by rapid evolution of gas typical of a high charge rate. Thus during long periods of inactivity, the vehicle's dual battery system is continually maintained at full charge.

When the vehicle is to be driven off on a call, selector switch assembly 36 is rotated from the "off" position to either the first battery 30, second battery 34 positions or both batteries 30 and 34 as required by the appropriate rotation of switch assembly 36.

When electrical system 40 of the vehicle is connected to and energized by either battery 30 or 34 or both batteries 30 and 34, relay coil 32c is also energized, thus opening relay contacts 32a and 32b thereby disconnecting bridge rectifier circuit 22 from the positive poles of batteries 30 and 34. Thus bridge rectifier 22 is disconnected from the circuit and does not have to provide the extra current demanded by the vehicle electrical system.

As the vehicle is driven away, tension releasable connector 14 separates leaving female connection member 14b behind while male connector 14a is carried along with the vehicle.

Although FIGS. 1 and 2 illustrate a dual battery system, it can be seen that the battery charging system of the present invention can also be used for a single battery system whereby second battery 34 can be eliminated along with relay contact 32b. The connection between the positive pole of battery 30 and relay contact 32a is then made to the ignition switch of the vehicle and operated in the same manner as previously described for the dual battery system.

Thus is described a battery charging system fo a motor vehicle that is fail-safe and readily adaptable for emergency vehicles and motor vehicles wherein the charging status of the batteries must be maintained at a peak at all times.

Figure 3:
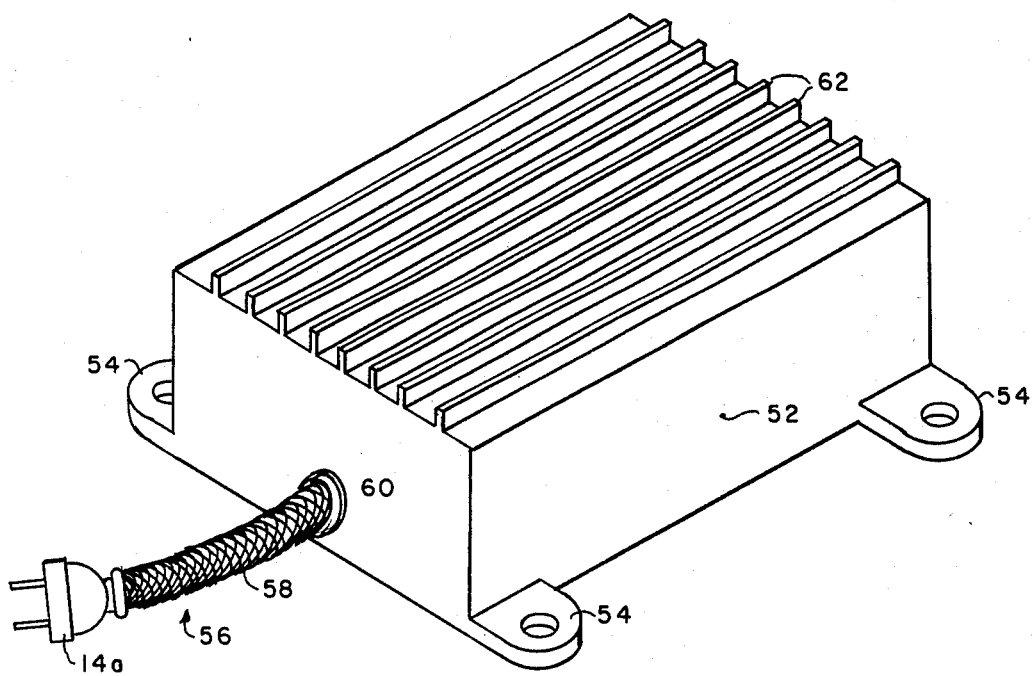
FIG. 3 is an isometric view of the housing containing the circuit elements of FIGS. 1 and 2 and showing the tension releasable member.

With reference to FIG. 3, there is illustrated an isometric view of housing 50 used to enclose the circuit elements of the circuit shown in FIGS. 1 and 2.

Housing 50 comprise, basically, a metallic shell 52 attached to which are mounting lugs 45, as shown. Alternating current input cable 56 is shown connected to male tension releasable connector member 14a. A tension mesh covering 58 is provided about cable 56 and is attached at one end to shell 52 at opening 60, and at its other end to male tension releasable connector member 14a.

A set of cooling fins 62 can be provided along one or more surfaces of shell 52 in order to assist the dissipation of heat generated by the circuit elements in the charger circuit of FIGS. 1 and 2.

In lieu of cooling fins 62, a heat sink comprising a thick walled shell 52 of a heat conducting metal can be used to assist in dissipating the heat generated by the circuit elements of FIGS. 1 and 2. Shell 52 can, for example, be fabricated from die cast aluminum. Such construction must be vapor tight and explosion proof, that is, shell 52 must be thick enough to contain any explosion of fuel vapors that may be limited therein.

I claim:

1. A motor vehicle battery charger circuit energized from an alternating current power source, said charger circuit comprising, means for converting the current from said alternating power source to a direct current, said means having an alternating current input side and a direct current output side, a tension releasable electrical connector electrically connecting said means for converting said alternating current to said alternating current power source, a first battery, a vehicle electrical system, means for connecting said battery to said vehicle electrical system and disconnecting said battery from said vehicle electrical system, means for connecting said direct current side of said means for converting said alternating current to said battery when said means for converting is connected to said alternating current power source and when said vehicle electrical system is disconnected from said battery, and means for disconnecting said battery from said means for converting when said battery is connected to said vehicle electrical system, said means comprising a first relay having an actuating coil and a set of normally closed contacts, said actuating coil connected in parallel with said vehicle electrical system and in series with said means for disconnecting said battery from said vehicle electrical system, said normally closed contacts being connected in series between said battery and said direct current output side of said means for converting said alternating current, said motor vehicle battery charging circuit being attached to and carried on said vehicle.

2. The motor vehicle battery charger circuit as claimed in claim 1 further comprising a second battery, means for connecting said direct current side of said means for converting said alternating current to said second battery when said means for converting is connected to said alternating current power source and when said vehicle electrical system is disconnected from said battery, means for preventing the flow of current between said second battery and said first battery when said means for converting is disconnected from said power source, and means for disconnecting said second battery from said means for converting when said second battery is connected to said vehicle electrical system.

3. The motor vehicle battery charger circuit as claimed in claim 2 wherein said means for preventing the flow of current between said first battery and said second battery comprises a second relay comprising an actuating coil and a set of normally open contacts, means for connecting one pole of said second battery between said direct current side of said means for converting an alternating current to a direct current and said normally open contacts of said second relay.

4. The motor vehicle battery charger circuit as claimed in claim 2 wherein, said means for preventing the flow of current between said first battery and said second battery comprises a second relay comprising a normally open set of contacts, said normally open set of contacts connected in series between said second battery and said direct current output side of said means for converting said alternating current to a direct current.

5. The motor vehicle battery charger circuit as claimed in claim 2 wherein said means for disconnecting said second battery from said means for converting an alternating current to a direct current when said second battery is connected to said vehicle electrical system comprises a first relay having an actuating coil and a first set of normally closed contacts, a second set of normally closed contacts actuated by said first relay actuating coil, said second set of normally closed contacts being connected in series between said second battery and said direct current output side of said means for converting said alternating current to a direct current.

6. A motor vehicle battery charger circuit energized from an alternating current power source, said charger circuit comprising an alternating current rectifier having an alternating current input side and a direct current output side, a tension releasable connector electrically connecting said alternating current side of said rectifier to said alternating current power source, a first battery, a vehicle electrical system, a switch connecting said battery to said vehicle electrical system and disconnecting said battery from said vehicle electrical system, a first relay having a set of normally closed contacts and an actuating coil, said actuating coil of said first relay connected in parallel with said vehicle electrical system and in series with said switch to said battery, said set of normally closed contacts of said first relay connected in series between said battery and said direct current output side of rectifier, a second relay having a set of normally open contacts and an actuating coil, said actuating coil of said second relay connected across the alternating current input side of said rectifier, said set of normally open contacts of said second relay connected in series with said battery, said normally closed contacts of said first relay and said direct current output side of said rectifier, and said motor vehicle battery charger circuit being attached to and carried on said motor vehicle.

* * * * *